United States Patent [19]

Croseck et al.

[11] 4,350,486

[45] Sep. 21, 1982

[54] PRESS FOR CERAMIC MOLDINGS

[75] Inventors: Hans-Henning Croseck, Konz; Rolf Jung, Trier, both of Fed. Rep. of Germany

[73] Assignee: Laeis-Werke AG, Trier, Fed. Rep. of Germany

[21] Appl. No.: 211,746

[22] Filed: Dec. 1, 1980

[30] Foreign Application Priority Data

Dec. 4, 1979 [DE] Fed. Rep. of Germany ....... 2948643

[51] Int. Cl.[3] .......................... B28B 7/06; B28B 7/34; B29C 1/00

[52] U.S. Cl. .................................... 425/412; 249/127; 249/134; 425/405 R; 425/DIG. 44; 425/DIG. 60

[58] Field of Search ............... 264/219, 225, 256, 313; 249/127, 156, 134; 425/419, DIG. 44, 405 R, 412, DIG. 30, DIG. 60

[56] References Cited

U.S. PATENT DOCUMENTS

| | | | |
|---|---|---|---|
| 1,712,233 | 5/1929 | Slick | 425/419 |
| 2,448,640 | 9/1948 | Weston | 264/26 |
| 2,615,229 | 10/1952 | Blackburn et al. | 264/219 |
| 2,965,946 | 12/1960 | Sweet et al. | 425/DIG. 44 |
| 3,173,974 | 3/1965 | Mohr | 425/DIG. 44 |
| 3,363,039 | 1/1968 | Nagai et al. | 249/156 |
| 3,408,436 | 10/1968 | Cubit | 264/225 |
| 3,548,050 | 12/1970 | Mozer | 264/225 |
| 3,594,877 | 7/1971 | Suda | 249/127 |
| 3,993,727 | 11/1976 | Skriletz et al. | 264/87 |

FOREIGN PATENT DOCUMENTS

| | | | |
|---|---|---|---|
| 1315523 | 2/1973 | United Kingdom | 425/DIG. 44 |

OTHER PUBLICATIONS

Wright et al., Solid Polyurethane Elastomers, MacLaren, London, (1970), pp. 199-201.

*Primary Examiner*—Willard E. Hoag

[57] ABSTRACT

A press mold having upper and lower jaws for pressing and molding articles of ceramic material. Each jaw supports a die, at least one of which has a molding matrix. A press ring mounted around the die having the matrix. Upper and lower contoured parts made of synthetic material or rubber are respectively mounted on the upper and lower die by adhesive. Each contoured part has a matrix. One of these matrices has an inner contoured edge which corresponds to the outer edge contour of the molding made by the press mold and having an outer contoured edge at least in the areas of the smaller diameters of the molding with respect to the areas of the largest diameter of the moldings in the direction of the surface of the molding which protrudes beyond this inner contoured edge and which has an even contour, such as a circle.

6 Claims, 8 Drawing Figures

FIG. 2
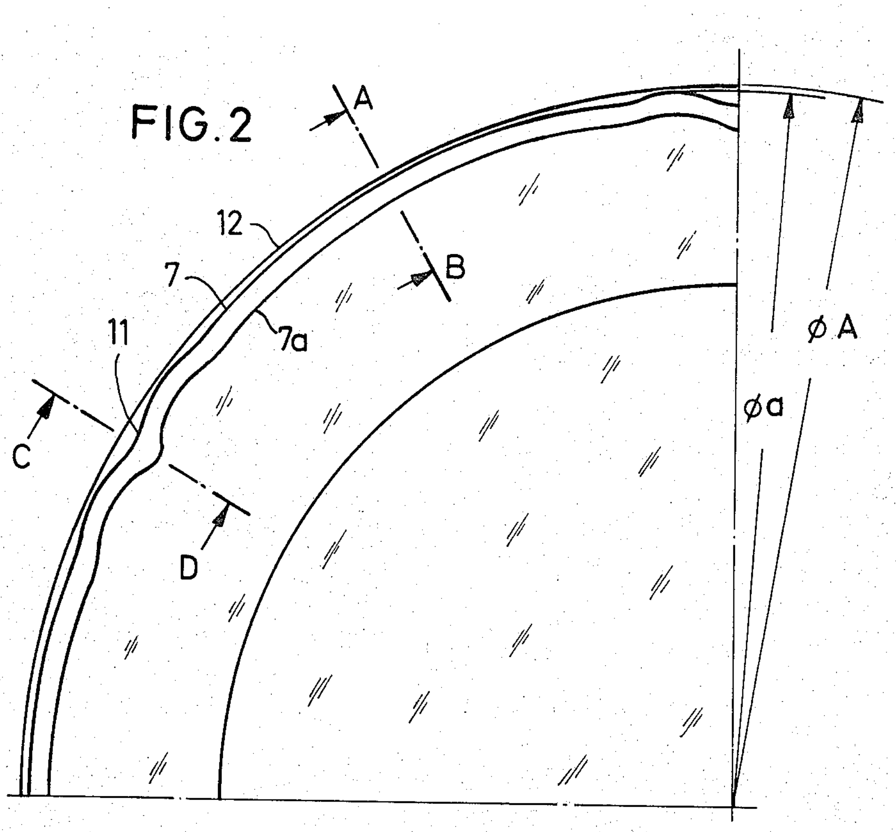
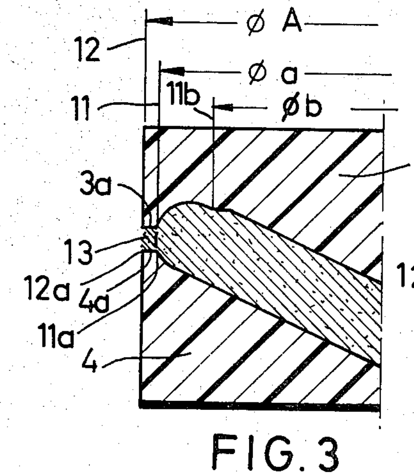
FIG. 3
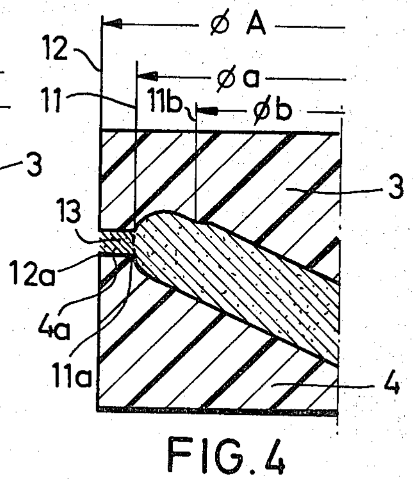
FIG. 4

PRESS FOR CERAMIC MOLDINGS

BACKGROUND OF THE INVENTION

The invention pertains to a press, in particular for ceramic moldings, having a molding chamber disposed between the press dies and press ring. Such a press for dry moldings, for example chinaware and crockery, is for example described in the co-pending and coassigned patent application Ser. No. 177,782, filed Aug. 13, 1980, entitled improved press for moldings. In such known presses the outer edges extending from the matrices of the press dies have a regular, uniform shape, for example these edges are round and circular in shape. It is therefore only possible to use such presses for the production of circular chinaware or crockery, for example, dishes, cups or bowls, having circular round edges. It is, however, desirable to also produce chinaware of other shapes, having for example undulated or serrated edges. Such chinaware and crockery had to be manufactured heretofore, by means of complex other types of machines and processes, for example, by means of roller-machines. It was also possible to produce this type of chinaware by means of press dies and press rings, having eroded or copy milled parts. This was found to be too costly.

SUMMARY OF THE INVENTION

It is a general object of this invention to provide a press by means of which chinaware and crockery can be manufactured which has edges having a non-round contour. It is a more specific object of the invention to reduce the manufacturing cost for the press die and press ring, and also to lower the operating costs for the press. As a side benefit, the press of the invention can also be used to manufacture crockery with round edges with improved results.

In accordance with the invention the press is so arranged that the matrices of the press dies (1, 2) in the contoured parts (3, 4) of the press dies which are connected to the dies are made out of synthetic material or rubber. Furthermore, each matrix of such contoured part has an inner contoured edge (11) 11*a*, which corresponds to the outer edge 7 of the molding, and further that an outer edge (12) of each contoured part at least in the region of reduced molding diameter a (the diameter of the molding at line C-D of FIG. 2) with respect the regions of the largest molding diameter A (the diameter of the molding at line A-B of FIG. 2) in the direction of the molding surface, protrudes beyond the edge 7, and has an even periphery, e.g. circle. Thereby, when pressing the parts of the material of the molding remaining between the radially inner and outer edges 11 and 12 of the contoured parts 3 and 4, this material can be scraped off as molding burrs after the pressing operation. The edges of the matrices can have such a shape and contour that the inner edge 11 (11*a*) thereof, in the region of the largest diameter of the crockery, which is being produced, extends over into the outer edge so as to merge with it and form one continuous edge. It is therefore possible, to produce the press die and rings as profiled machine turned pieces, whereas otherwise with an uneven course of the molding edges the press die and press ring would have to be manufactured by costly copy or erosion processes.

Depending on the shape and wall thickness of the molding it is sufficient if only the matrix of a press die, preferably the upper die, has the inner contoured edge, whereas the other matrix has only an outer edge with a regular, even course. This makes it possible, to produce the entire other press die with matrix as a turned piece on a lathe or grinding machine. In accordance with a further embodiment of the invention, the outer edge of the matrices has the shape of an ellipse or a rectangle, whereas the inner edge corresponds to the uneven edge line of the molding. This also makes it eaiser to manufacture the press dies and press rings and, if necessary also the annular filling cavity.

It is also possible to make both edges of the matrices in the shape of circles, ellipses or rectangles which are spaced from each other. This reduces the costs for the manufacture of the matrices and for molding of crockery having round edges. The synthetic resin used for making the contoured parts is, preferably, epoxy resin, neoprene or polyurethane. It is then preferred to make the contoured parts in the form of cast or injection molded parts or as vulcanized parts when using rubber.

In accordance with the invention the manufacture of the contoured parts can be carried out by the synthetic resin casting process using a master model arranged on a mold in a socket of gypsum or plaster of Paris or a castable synthetic material, the socket and the master model having been pretreated with a separating agent, for example wax. By means of the separating medium a prevention of the formation of a bond between the master model or the socket and the synthetic material during casting is obtained. The cast master model is worked over after removal from the mold. Still a more simple manufacture of the contoured part is achieved when using the synthetic resin casting method by casting directly over a master model made out of steel, aluminum, synthetic material, epoxy resin or gypsum.

BRIEF DESCRIPTION OF THE DRAWING

These and other objects of the invention are realized and illustrated in the several preferred embodiments shown in the accompanying drawings.

FIG. 2 is a horizontal plan view of an arcuate portion over 90° of the pressing mold chamber showing a plate with undulated or jagged edge positioned therein;

FIGS. 3, 4 and 4A are cross-sectional views respectively along lines A-B and C-D of FIG. 2 wherein all parts are shown about twice as large as in FIG. 2.

DETAILED DESCRIPTION

Figure 1:
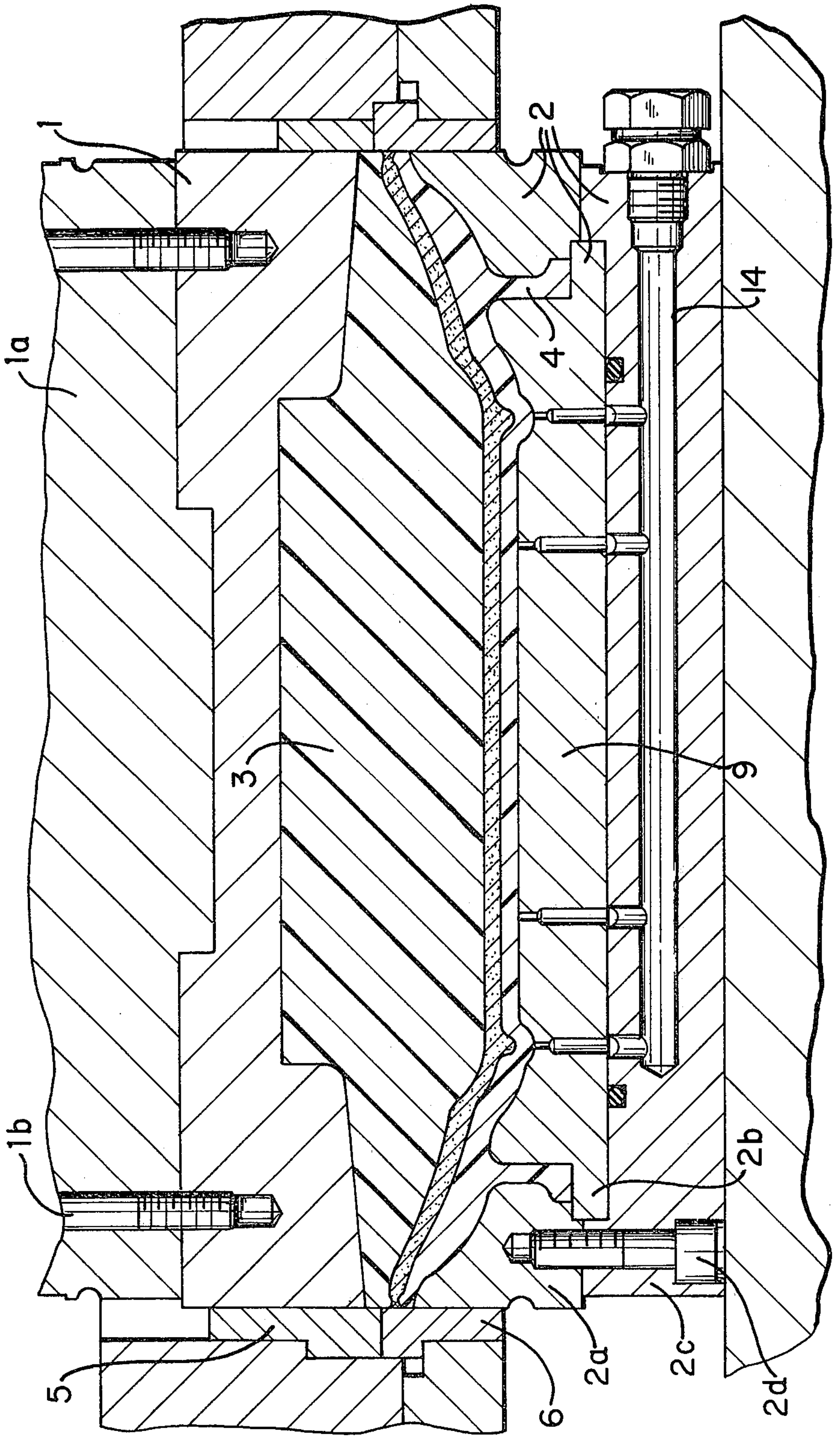
FIG. 1 is a transverse cross-section through the press of the invention in the region of the press dies, showing the press dies in a closed position.
Figure 1A:
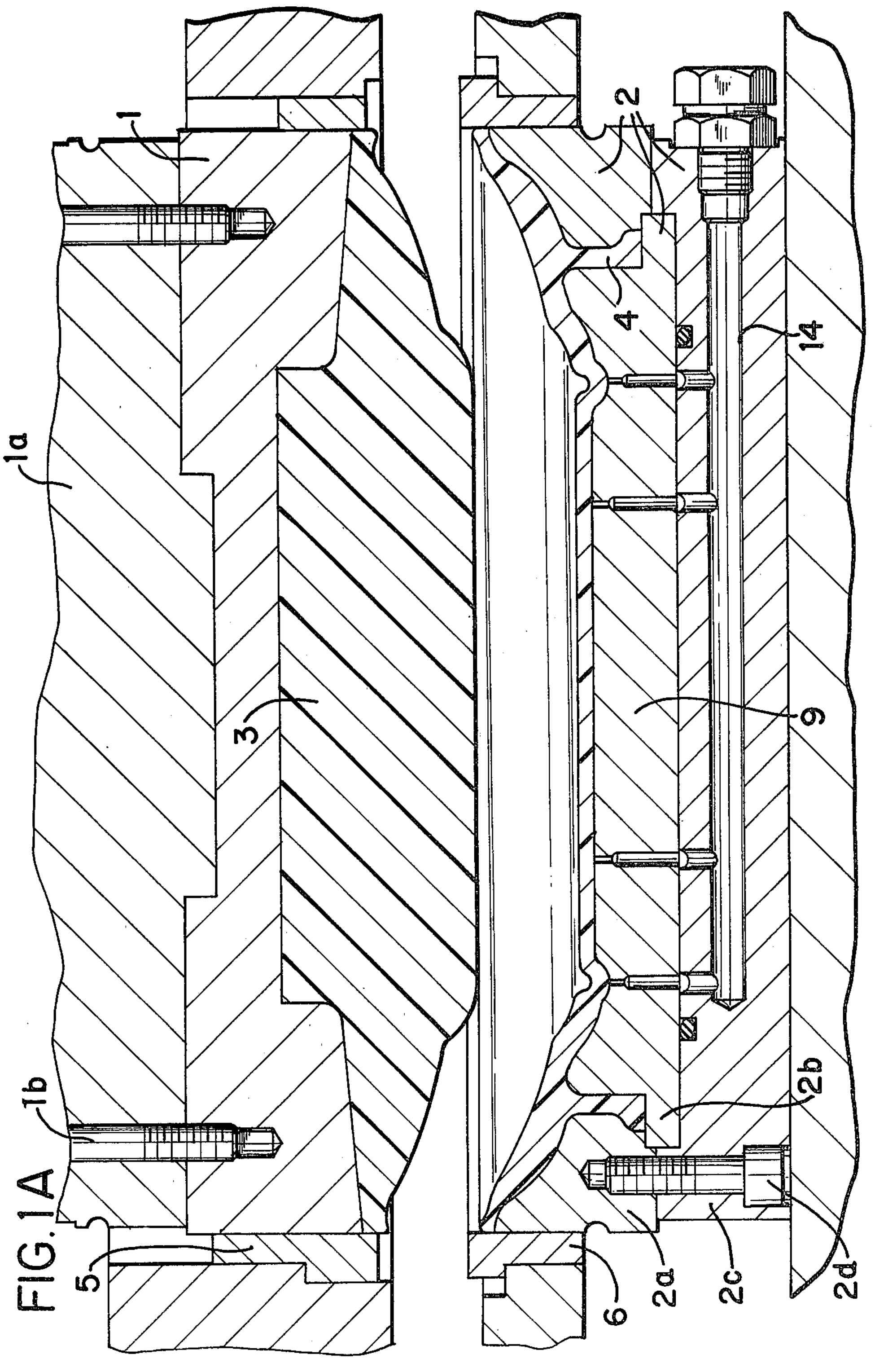
FIG. 1*a* is a transverse cross-section through the press of this invention in the region of the press dies, showing the press dies in an open position.

In FIGS. 1 and 1*a* reference number 1 refers to the upper die, which is secured with threaded bolts 1B onto the upper press jaw 1A. The lower surface of upper die 1 is joined to the upper surface of the contoured part 3, for example, by gluing. The lower die 2 is composed of parts 2*a*, 2*b*, 2*c*, which are fastened together by means of the threaded bolts 2*d*. The contoured part 4 has an annular foot protrusion wedged between the parts 2*a* and 2*b* between which it is clamped and is held rigidly by means of the lower die 2. A suction, respectively pressure, conduit 14, having suitable outlets in the lower die 2, extends through the die portions **2*b* and 2*c* and can alternatively be connected to a non-illustrated pressure or suction source. When the mold chamber is filled, the contoured part 4 is firmly held against the die portion 2*b* by means of the suction effect produced by the suction conduit 14, on the one hand, and during the pressing operation pressure medium flowing through the same conduits 14 can be applied against this contoured part 4 which now is in the form of a membrane, on the other hand. The contoured parts may be secured to the die members by adhesion, vulcanisation or even casting. Reference number 5 denotes the annular filling ring and reference number 6** denotes the pressing ring which in turn are connected to parts of the mold (not shown).

FIG. 2 illustrates the form of a plate having an irregular non-circular edge 7. The reference number 11 denotes, as can be noted in FIGS. 3 and 4, the inner edge of the matrix of contoured part 3 and the reference number 12 the outer most edge of the outer border **3*a* of the contoured part 3. Reference number 13** indicates that after the pressing process burrs of material form at the edge of the formed plate or other piece of crockery which has to be scraped off after pressing. The diameter A and the diameter a represent the largest and smallest diameter of the plate.

As can be noted from FIGS. 3 and 4 the inner edge 11 of the upper borders **3*a* of the matrix forming the contoured part 3, respectively of the lower border 4*a* of the contoured part 4, extends, along an irregular line (see FIG. 2) in particular in the region of line C-D (in particular where the diameter A of the molding is reduced) whereas the outer edge 12 of the contoured parts 3, 4 have at all times a regular course such as a circular configuration corresponding to the diameter A. The inner edge 11 and outer 12, respectively the inner edge 11*a* and outer edge 12*a*, of the contoured part 3, respectively 4, can, in the regions where there is a regular border, that is to the left and right of line A-B in FIG. 2, merge into one edge. The dish, or other piece of crockery, as illustrated in FIG. 2, has in addition to the outer edge line 7 an inner edge line 7*a* for decorative purposes. Correspondingly the contoured part 3 has a third edge 11*b* at their underside, which is indicated in FIGS. 3 and 4** with the diameter b.

Figure 4A:
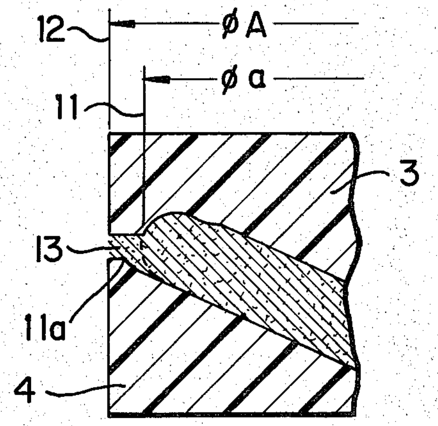

As can be noted from FIG. 4A in an alternate embodiment of the invention the inner edge **11*a* of the lower contoured part 4 can maintain a regular course or line also in the region of line C-D that is along the entire perimeter, whereas the inner edge 11 of the upper contoured part 3** follows an irregular course as described hereinabove.

Figure 5:
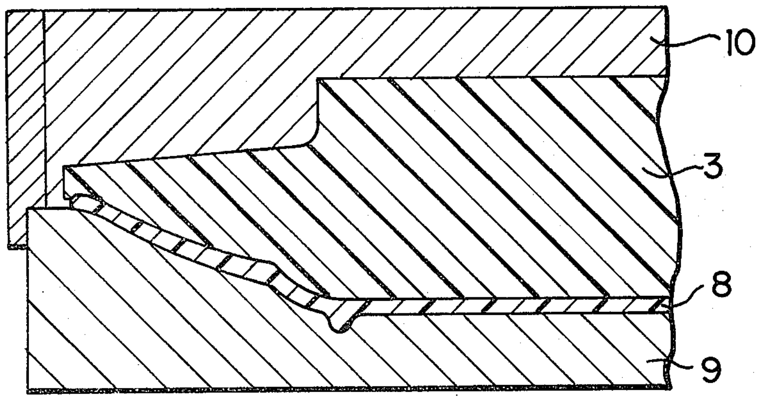
FIG. 5 is a cross-sectional view through a mold for the contoured part of an upper die.

FIG. 5 illustrates the shape of the socket 9 and the upper part 10 of the mold, into which is placed a master model 8 made out of epoxy resin or a prefired plate made of ceramic material. The contoured part 3 (cope) is cast between the parts 9 and 10.

Figure 6:
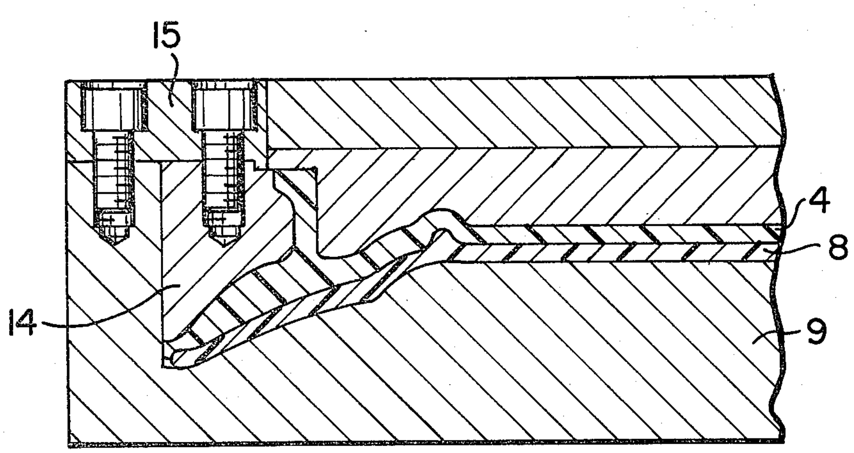
FIG. 6 is a cross-sectional view through a contoured part of a lower die adapted in the form of a press membrane.

FIG. 6 illustrates a mold side part 14 fixed to the socket 9 and a mold upper part 15 by means of which the casting of the annular protrusion of the contoured part 4 (drag) formed as a membrane is made possible.

The casting can be further simplified in that the parts 8 and 9 are formed as a single part about which there is simply mounted a sheet metal ring, so that a direct casting onto this contoured part can be effected without requiring any further casting mold parts.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

We claim:

1. A press mold for pressing and molding articles of ceramic material having undulated or serrated edges, said press mold having upper and lower jaws confronting each other and movably mounted relative to each other, an upper and lower die respectively mounted on said upper and lower jaws, upper and lower parts made of synthetic material or rubber and having confronting matrices which respectively adhere to said upper and lower dies, a press ring coaxially mounted around at least one of said dies, but one matrix of said confronting matrices having an inner undulated or serrated contoured edge which corresponds to the outer undulated or serrated edge of the molding made by the press mold, and both matrices also each having an outer edge which has an even periphery, e.g. a circle, which periphery in the radial direction of the surface of the molding is at least coextensive with the largest diameter of the molding.

2. A press mold for pressing and molding articles of ceramic material as set forth in claim 1, wherein only the upper die has a matrix with said inner contoured edge, whereas the lower die has an upper border provided with an even periphery at its outer and inner edges.

3. A press mold for pressing and molding articles of ceramic material as set forth in claim 2, wherein said outer contoured edge is in the form of an ellipse.

4. A press mold for pressing and molding articles of ceramic material as set forth in claim 2, wherein in the case of rectangularly shaped articles at least one of said upper and lower parts has an outer contoured edge in the form of a rectangle, and said coextensive portion of the periphery of said molding follows a rectangular course which corresponds to said even periphery.

5. A press mold for pressing and molding articles of ceramic material as set forth in claim 2, wherein said contoured edge is in a form selected from the form of circles, ellipses and rectangles arranged at intervals with respect to each other.

6. A press mold for pressing and molding articles of ceramic material as set forth in claim 5, wherein said upper and lower parts of said dies are made of material selected from epoxy resin, neoprene or polyurethane.

* * * * *